UNITED STATES PATENT OFFICE.

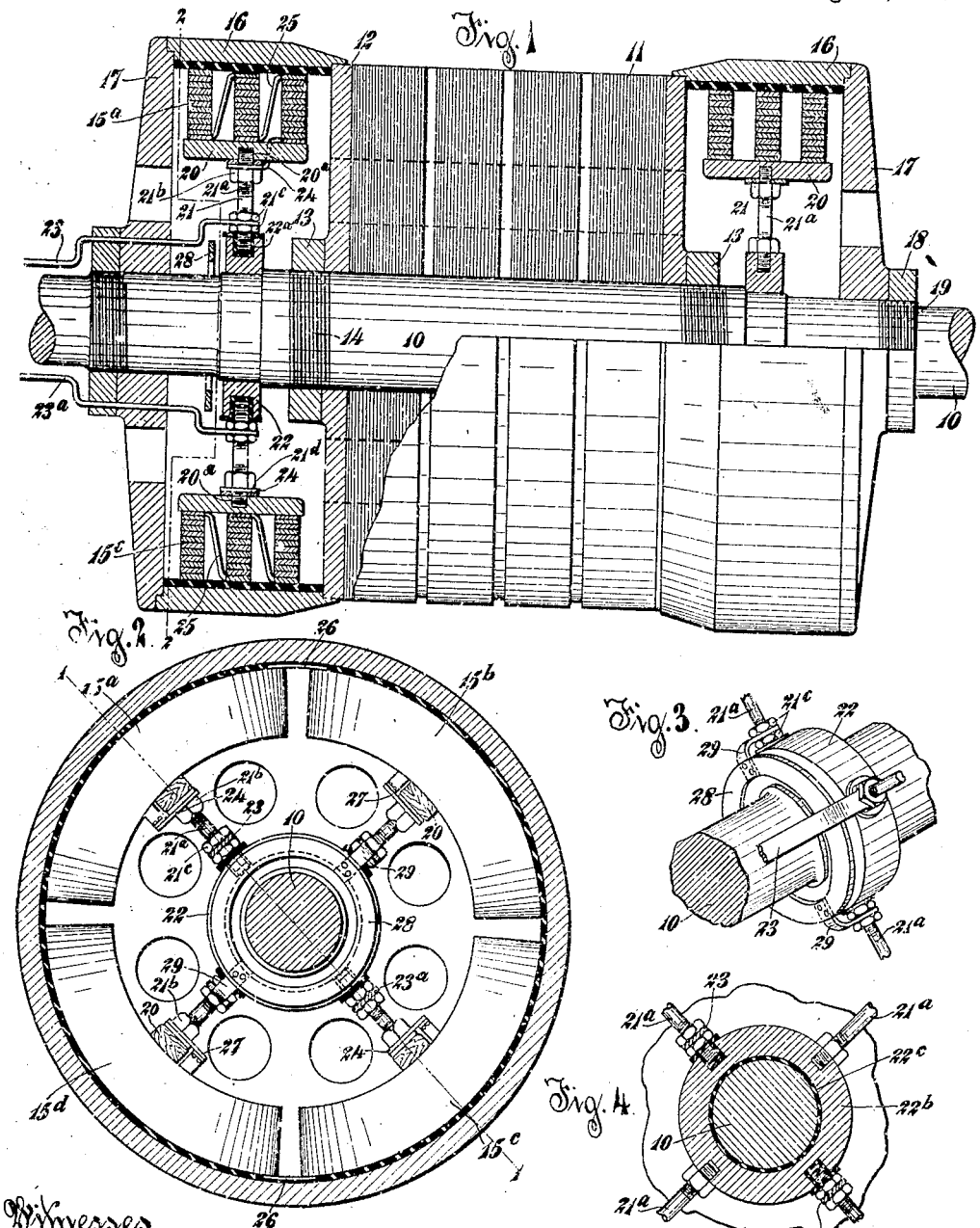

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO, JOINTLY.

TURBO-ROTOR.

932,083.   Specification of Letters Patent.   Patented Aug. 24, 1909.

Application filed February 28, 1907. Serial No. 359,853.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in Turbo-Rotors, of which the following is a full, clear, and exact specification.

My invention relates to rotary members or rotors of high speed dynamo-electric machines, such as rotary field members of turbo-alternators, particularly rotors having two or more pairs of poles, although some of the features of my invention are not limited to rotors of any specific number of poles.

The object of my invention is to provide a rotor construction all parts of which are well balanced and well supported so that there is no liability of vibration or of any of the parts being displaced at high speeds.

My invention consists in certain novel details of construction and combinations and arrangements of parts which will be described in the specification and set forth in the appended claims.

For a better understanding of my invention reference is had to the accompanying drawings in which—

Figure 1 is a view partially in elevation and partially in section of a rotary field member of a turbo-alternator equipped with my invention, the section being taken approximately along the line 1—1 of Fig. 2; Fig. 2 is a transverse section through the same, along the line 2—2 of Fig. 1; Fig. 3 is a perspective of a portion of the structure showing portions of the coil and collector lead connections; and Fig. 4 is a sectional view showing a modification.

Referring now to the figures of the drawing, 10 represents a shaft of the rotor on which is mounted a cylindrical core 11 consisting in this case of laminæ clamped together by end disks 12, and nuts 13 engaging threaded portions 14 of the shaft. The core is slotted radially and is provided with field coils arranged in groups, each group consisting of a number of coils arranged concentrically about one of the poles. In this case I have shown four poles and four groups of coils 15$^a$, 15$^b$, 15$^c$ and 15$^d$, each group consisting of three concentric coils. The ends of the coils project beyond the core and are inclosed within end covers each of which consists in this case of two parts, a heavy ring or band 16 surrounding the ends of the coils, and an end-plate 17 mounted on the shaft and engaging the ring 16. Each of the end covers is held in place by a nut 18 engaging a threaded portion 19 of the shaft. The ends of the coils bear against the outer rings or band 16, being separated therefrom by insulation. If desired the coils may be spaced from each other and from the adjacent end disks 12 and end-plates 17 by insulating spacing members. The latter have been omitted in this case for the sake of clearness.

The parts so far described are old and I claim no novelty therein.

One of the most serious and difficult problems which confront builders of high speed dynamo-electric machines is the elimination of vibration. In order that a rotor will not vibrate at high speeds it is necessary that all parts be retained rigidly and firmly in position so that they can not move about or shift under the action of centrifugal force, and that the structure be very nearly perfectly balanced. As rotors are usually constructed the coil and collector connections can not be symmetrically arranged and have therefore rendered difficult the elimination of vibration. For example in a four pole rotor the two collector leads are usually connected to the coils or groups of coils surrounding adjacent poles and hence the points of connections of the leads and coils are less than 180° apart. Also the connections between adjacent groups of coils do not balance each other. By my improvements now to be described the coils are so supported and the coils are so connected to each other and to the collector rings that a balanced structure results.

In order that the ends of the coils will not be shifted by centrifugal force I press them firmly against the outer rings 16 by means of transverse coil supporting members 20 and radial, expansible supporting members 21. The supports 20 preferably consist of strips of blocks of insulating material, preferably wood, and each extend across and engage the end-turns of all the coils of one group. In this instance there are two supports for each group of coils, one at each end of the core. The radial supporting members consist in this instance of bolts 21$^a$ threaded at each end and provided with nuts 21$^b$ near their outer ends and nuts 21$^c$ near their inner ends. The outer ends of the supporting bolts extend into recesses or openings 20$^a$, in the supporting strips or blocks 20, and the inner ends of the bolts preferably extend into recesses or openings 22$^a$ in metal rings or annular members 22 mounted on the shaft within the overhanging or projecting portions of the coils. Thus it is seen that by tightening or spreading the nuts 21$^b$ and 21$^c$ the blocks 20 are forced outward, pressing the coils firmly against the outer rings 16 of the end covers. Not only do the bolts serve to support the coils, but some also serve to carry current to and from the coils as will now be explained.

At 23 and 23$^a$ are shown two collector leads arranged 180° apart or diametrically opposite each other. The end of lead 23 is electrically connected to the bolt 21$^a$ supporting the group of coils 15$^a$, in this instance, being clamped between a pair of nuts 21$^c$ at the inner end of the bolt. In a similar manner lead 23$^a$ is electrically connected to the bolt 21$^a$ supporting the diametrically opposite group of coils 15$^c$. Group 15$^a$ of the coils is electrically connected to its supporting bolt 21$^a$ by means of a strap conductor 24, leading in this instance to the inner layer of the innermost coil of the group. As here shown the end of the conductor 24 is clamped between nut 21$^b$ and a washer 21$^d$ between the nut and the supporting member 20. In a similar manner collector lead 23$^a$ and the corresponding radial bolt 21$^a$ are connected to the inner coil of group 15$^c$. The two coil supporting bolts to which the leads are connected are insulated from the ring or annular member 22. The different coils of each group are connected in series by means of short strap conductors 25 extending in this case from the outer layer or conductor of one coil to the inner layer of the next adjacent coil. Coils 15$^a$ and 15$^c$ are connected respectively to the coils 15$^b$ and 15$^d$ adjacent thereto, by means of diametrically opposite, short strap conductors 26 shown in Fig. 2, and the latter coils are connected together to complete the circuit through all the coils from one collector lead to the other. The connection between coils 15$^b$ and 15$^d$ is accomplished in this case by electrically connecting the coils to their supporting bolts and connecting the bolts together by a conducting ring or annular member so as not to disturb the balance of the machine. As here shown, coils 15$^b$ and 15$^d$ are connected to their supporting bolts 21$^a$ by straps 27 in exactly the same manner as coils 15$^a$ and 15$^c$ are connected to their supporting bolts. I prefer to connect the bolts which are electrically connected to the coils 15$^b$ and 15$^d$ by a separate conducting ring 28 insulated from the shaft and other parts. The respective bolts 21$^a$ are connected to the ring 28 by means of strap conductors 29 as shown in Figs. 2 and 3, which strap conductors are preferably riveted to the ring and clamped between nuts 21$^c$ on the inner ends of the bolts. As here shown the straps 29 alone support the ring. If desired, however, the ring may be otherwise supported.

In Fig. 4 I have shown a construction in which the additional conducting ring 28 connected to the coils 15$^b$ and 15$^d$ is dispensed with. In this case I secure electrical connection between the bolts 21$^a$ which support the coils 15$^b$ and 15$^d$ by means of the ring or annular member which is mounted on the shaft and supports the bolts. In this case the ring or annular member is shown at 22$^b$, being separated from the shaft by insulation 22$^c$. The coil supporting bolts 21$^a$ to which the collector leads are connected are insulated from this ring as in the construction first described, but the other pair of bolts 21$^a$ which are connected to coils 15$^b$ and 15$^d$ are electrically connected with the ring as shown. Thus the annular member 22$^b$ not only serves the function of the annular member 22 in the first described construction, that is, to support the bolts 21$^a$, but also serves as a connector between the coils 15$^b$ and 15$^d$ or the bolts electrically connected to said coils.

The path of the current through the coils is as follows:—Assuming that collector lead 23 is the positive lead, current passes from lead 23, to coil 15$^a$, conductor 26, coil 15$^b$, conducting ring 28, coil 15$^d$, conductor 26, coil 15$^c$, and to collector lead 23$^a$.

It is seen that the balance of the rotor is not in the least disturbed by the coil and the collector connections. The collector leads 23 and 23$^a$ being diametrically opposite, balance each other, as do likewise all the other conductors or connectors including the bolts 21, strap conductors 24, strap conductors 26, strap conductors 27, ring 28 and strap conductors 29. Also there is little tendency of any of the parts including the coils and connectors being displaced at high speeds of rotation. Furthermore with this construction long flexible collector and coil connecting conductors are dispensed with.

In this instance the bolts 21$^a$ at the right hand side of Fig. 1 or at the end of the machine opposite the collector rings serve merely as coil supports. If desired, however, ring 28 may be located at this end of the machine, in which case two of these bolts will serve to conduct the current between the coils 15$^b$ and 15$^d$.

I wish it to be understood that while I have shown a four-pole machine, my invention is equally applicable to a machine having a greater number of poles, and most of the features of my invention are applicable to a machine having two poles. In a rotor having more than two pairs of poles it might be desirable under certain circumstances to connect together more than one pair of coils by a conducting ring but I prefer to connect only two coils in this manner and effect the necessary electrical connections between the other coils by short strap conductors. I do not wish therefore to be confined to the exact details shown, but aim in my claims to cover all modifications which do not involve a departure from the spirit and scope of my invention.

What I claim as new is:—

1. In a rotor of a dynamo-electric machine, a shaft, a core, a winding consisting of coils having portions projecting beyond the ends of the core, rings or bands encircling the projecting portions of the coils, a pair of annular members mounted on the shaft within the projecting ends of the coils, and means for forcing said ends of the coils outward into engagement with the rings or bands comprising radial bolts between the coils and said annular members and adjustable members on said bolts.

2. In a rotor of a dynamo-electric machine, a shaft, a core, coils carried by said core and projecting beyond the ends thereof, rings surrounding the ends of the coils, annular members on the shaft, and devices between said annular members on the shaft and the ends of the coils for forcing the latter outwardly against the rings, each of said devices comprising coöperating threaded members relatively adjustable in a radial direction.

3. In a rotor of a dynamo-electric machine, a shaft, a core, coils carried by said core and projecting beyond the ends thereof, said coils being arranged concentrically about each pole, supporting members engaging the end-turns of each group of coils, annular members mounted on the shaft within the projecting ends of the coils, and means for forcing said supporting members outward comprising radially expansible devices between said annular members on the shaft and said supporting members, each of said devices comprising coöperating relatively adjustable threaded members.

4. In a rotor of a dynamo-electric machine, a shaft, a core, groups of concentric coils carried by said core and projecting beyond the ends thereof, annular members mounted on the shaft within the projecting portions of the coils, insulating supporting members engaging the inner portions of the end-turns of the coils, radial bolts engaging recesses or sockets in said coil-supporting members and annular members on the shaft, and adjustable nuts on said bolts for forcing the supporting members and end-turns of the coils outward into engagement with the rings or bands surrounding the coils.

5. In a rotor of a dynamo-electric machine, a core, coils carried by the core, and projecting beyond the end thereof, an annular coil retaining member surrounding the projecting portions of the coils, means for holding said portions of the coils in engagement with the annular member, said means being electrically connected to the coils and serving to carry current to and from the same.

6. In a rotor of a dynamo-electric machine, a core, coils carried by the core, and having ends projecting beyond the same, annular members surrounding the ends of the coils, means for forcing the ends of the coils outwardly against said annular members, said means being electrically connected to the coils, and collector leads connected to said means.

7. In a rotor of a dynamo-electric machine, a core, coils carried by said core and projecting beyond the ends thereof, and radial expansible supporting members for the projecting portions of the coils, said supporting members being electrically connected to the coils and to collector leads.

8. In a rotor of a dynamo-electric machine, a core, coils carried by said core and projecting beyond the ends thereof, and radial bolts extending between the shaft and the projecting portions of the coils and electrically connected to the coils, so that said bolts serve to carry current to and from the coils.

9. In a rotor of a dynamo-electric machine, a core having a plurality of pairs of poles, groups of coils on said poles, a pair of collector leads connected to two groups diametrically opposite each other, a conducting ring connected to two other groups diametrically opposite each other, and conductors electrically connecting respectively the first named diametrically opposite groups of coils to the second named diametrically opposite groups of coils.

10. In a rotor of a dynamo-electric machine, a core having a plurality of pairs of poles, coils on said poles, a pair of diametrically opposite collector leads connected respectively to coils at diametrically opposite points, a conducting ring connected to two other coils at diametrically opposite points, and conductors electrically connecting respectively the first named diametrically opposite coils to the second named diametrically opposite coils.

11. In a high speed rotor, a shaft, a core having a plurality of pairs of poles, coils surrounding the poles, a pair of collector leads connected to a pair of coils diametrically opposite each other, conductors connecting said coils respectively to an adjacent pair of coils diametrically opposite each other, and conductors connecting said last named coils together.

12. In a high speed rotor, a shaft, a core having two pairs of poles, coils surrounding the poles, a pair of collector leads connected to two coils diametrically opposite each other, a pair of conductors connecting respectively said diametrically opposite coils to the other two coils which are also diametrically opposite each other, and a conducting ring electrically connecting the last named coils.

13. In a high speed rotor, a shaft, a core having a plurality of pairs of poles, coils surrounding the poles, a pair of collector leads connected to a pair of coils diametrically opposite each other, diametrically opposite conductors connecting said coils respectively to an adjacent pair of coils diametrically opposite each other, and conductors connecting said last named coils together.

In testimony whereof I affix my signature, in the presence of two witnesses.

ALFRED H. WOUTERS.

Witnesses:
RUBY ROBINSON,
FRED J. KINSEY.